US 11,055,936 B2

(12) United States Patent
Warrier et al.

(10) Patent No.: US 11,055,936 B2
(45) Date of Patent: Jul. 6, 2021

(54) MULTI-SENSOR PASSIVE KEYLESS FUNCTIONALITY

(71) Applicant: DIRECTED, LLC, Vista, CA (US)

(72) Inventors: Aravind Warrier, Dorval (CA); Sylvain Jalbert, St Lazare (CA); Robert Andre Lacroix, Lachine (CA)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 5 days.

(21) Appl. No.: 16/401,704

(22) Filed: May 2, 2019

(65) Prior Publication Data

US 2020/0349781 A1    Nov. 5, 2020

(51) Int. Cl.
*G07C 9/00* (2020.01)
*H04B 17/318* (2015.01)

(52) U.S. Cl.
CPC ..... *G07C 9/00182* (2013.01); *G07C 9/00309* (2013.01); *H04B 17/318* (2015.01); *G07C 2009/0023* (2013.01); *G07C 2209/63* (2013.01)

(58) Field of Classification Search
CPC .................. G07C 9/00309; G07C 2209/63
See application file for complete search history.

(56) References Cited

U.S. PATENT DOCUMENTS

| 10,387,826 B2 | 8/2019 | Simmons |
| 2013/0297194 A1 | 11/2013 | Wisnia et al. |
| 2015/0048927 A1 | 2/2015 | Simmons |
| 2017/0052538 A1* | 2/2017 | Li .................. B60N 2/0248 |
| 2017/0210342 A1 | 7/2017 | De Wind et al. |
| 2017/0282858 A1 | 10/2017 | Sass |

OTHER PUBLICATIONS

Devanshi et al., Indoor Localization based on Bluetooth Technology: A Brief Review, Jul. 2014, pp. 31-33 (all), vol. 97—No. 8, International Journal of Computer Applications (0975-8887), www.ijcaonline.org.

(Continued)

*Primary Examiner* — Daniell L Negron
(74) *Attorney, Agent, or Firm* — Anatoly S. Weiser, Esq.; IPLCounsel.com

(57) ABSTRACT

In selected examples, a vehicle control system (VCS) includes Bluetooth beacons and an app running on a mobile device, such as a smartphone or a key fob equipped with movement sensors and a Bluetooth® transceiver. Passive keyless entry capability of the system uses received signal strength indications (RSSIs) together with movement-related indications of the movement sensors to determine when the mobile device moves away from the vehicle beyond a predetermined departure distance, and/or approaches the vehicle to within a predetermined arrival distance. When the user approaches the vehicle, the mobile device automatically transmits an arrival notification to the VCS, which automatically performs arrival actions, e.g., unlocking doors and disarming security features of the VCS/vehicle. When the user moves away from the vehicle, the mobile device automatically transmits a departures notification to the VCS, which performs departure actions, e.g., locking the vehicle and arming the security features of the VCS/vehicle.

22 Claims, 4 Drawing Sheets

(56) References Cited

OTHER PUBLICATIONS

Silke Feldmann et al., An indoor Bluetooth-based positioning system: concept, implementation and experimental evaluation, 2003, all pages, Conference: Proceedings of the International Conference on Wireless Networks, ICWN '03, Jun. 23-26, 2003, Las Vegas, Nevada, USA.

Elbatsh et al., RSSI Gradient: New Predictor and Filter to Support Sporadic Wireless Service Interruptions, 2008, pp. 70-78 (all), Proceedings of the Seventh IASTED International Conference Communication Systems and Networks (CSN 2008), Sep. 2008, Spain.

Papamanthou et al., Algorithms for Location Estimation Based on RSSI Sampling, pp. 72-86 (all), Department of Computer Science and Center for Geometric Computing, Brown University, USA.

Subhan et al., Extended Gradient Predictor and Filter for Smoothing RSSI, 2014, all pages, 16th International Conference on Advanced Communication Technology, Pyeongchang, South Korea.

Jayakody et al., Novel Smoothing Approach for Indoor Positioning Bluetooth Networks using RSSI, pp. 13-35 (all), NTCM-1016.

Raghavan et al., Accurate Mobile Robot Localization in indoor environments using Bluetooth, 2010, all pages, 2010 IEEE International Conference on Robotics and Automation, AK, USA.

Paterna et al., A Bluetooth Low Energy Indoor Positioning System with Channel Diversity, Weighted Trilateration and Kalman Filtering, Sensors, 2017, all pages.

Larsson, Distance Estimation and Positioning Based on Bluetooth Low Energy Technology, Master of Science Thesis, KTH Royal Institute of Technology, all pages, 2015, Sweden.

Jackson et al., Emitter geolocation estimation using power difference of arrival, 2011, Defence R&D Canada—Ottawa, all pages.

* cited by examiner

MULTI-SENSOR PASSIVE KEYLESS FUNCTIONALITY

FIELD OF THE DISCLOSURE

This disclosure relates generally to the field of vehicular and other security, convenience, monitoring, and control products, both original equipment manufacturer (OEM) and aftermarket systems.

BACKGROUND

Vehicle control systems may be OEM and aftermarket electronic systems installed in vehicles for security and users' convenience. The functionality provided by such systems may include remote start capability, passive keyless entry, passive locking and unlocking, and other security and convenience features.

A need in the art exists for improved techniques for operating certain security and convenience features of vehicles equipped with such systems, including operating the features automatically. A need in the art exists for improved operation of automatic activation and deactivation of certain security and convenience features of the vehicles and vehicle control systems, including improved reliability of locking, unlocking, alarm activation, alarm deactivation; and reduced power consumption on the vehicle side and on the user device side.

SUMMARY

This document describes embodiments, variants, implementations, and examples of novel techniques for addressing one or more of the needs identified above, and/or other needs. Selected embodiments described in this document include methods, apparatus, and articles of manufacture that enable improved techniques of passive keyless entry into vehicles and structures.

In an embodiment, a method of automatic passive action operation includes obtaining received signal strength indications (RSSIs) of a first beacon transmissions by a processor of a mobile device through a relatively short range radio frequency (RF) transceiver of the mobile device; obtaining, one or more movement-related indications by the processor from one or more movement sensors of the mobile device; processing of the RSSIs by the processor to obtain a plurality of RSSI-derived first values; estimating by the processor distances between the mobile device and the first beacon corresponding to the RSSI-derived first values, thereby acquiring a time series of first distance estimates, the time series of first distance estimates comprising a first previous distance estimate and a first current distance estimate, the first current distance estimate being later in the time series than the first previous distance estimate; selecting by the processor a selected distance estimate from the first current distance estimate and the first previous distance estimate based on the one or more movement-related indications; determining by the processor whether one or more distance conditions are met by the selected distance estimate; and in response to any of the one or more distance conditions being met by the selected distance estimate, notifying automatically an asset-installed system of the distance condition being met, the asset-installed system comprising the first beacon.

In aspects, the one or more distance conditions include an arrival distance condition and a departure distance condition. The arrival distance condition is met in response to the mobile device moving to within a predetermined arrival distance of the first beacon, and the departure distance condition is met in response to the mobile device moving away from the first beacon to beyond a predetermined departure distance.

In aspects, the asset-installed system is installed in a vehicle.

In aspects, the asset-installed system is configured to control access to the vehicle including locking and unlocking of one or more access points of the vehicle and arming and disarming of one or more security features of the vehicle.

In aspects, the step of notifying includes sending an arrival notification in response to the arrival distance condition being met; the step of notifying includes sending a departure notification in response to the departure distance condition being met; automatically locking the one or more access points of the vehicle by the asset-installed system in response to receiving the departure notification by the asset-installed system; and automatically unlocking the one or more access points of the vehicle by the asset-installed system in response to receiving the arrival notification by the asset-installed system.

In aspects, the method also includes automatically arming the one or more security features in response to receiving the departure notification by the asset-installed system; and automatically disarming the one or more security features in response to receiving the arrival notification by the asset-installed system.

In aspects, the relatively-short range RF transceiver of the mobile device is a Bluetooth transceiver or a Bluetooth Low Energy (BLE) transceiver.

In aspects, the mobile device is a keyfob.

In aspects, the mobile device is a smartphone.

In aspects, the step of processing of the RSSIs by the processor to obtain the plurality of RSSI-derived first values includes: assigning the RSSIs into a plurality of time slots; trimming lower and upper RSSI quintiles in each time slot; averaging remaining RSSIs of said each time slot to obtain RSSI average for said each time slot; if time slots with missing RSSI averages are present, interpolating RSSI averages for the time slots with missing RSSI averages; and filtering the RSSI averages with a Kalman filter to derive the plurality of RSSI-derived first values.

In aspects, the step of selecting by the processor the selected distance estimate comprises includes estimating speed of movement of the mobile device to obtain a current speed estimate, selecting the first current distance estimate in response to the current speed estimate exceeding a predetermined speed threshold, and selecting the first previous distance estimate in response to the current speed estimate not exceeding the predetermined speed threshold.

In aspects, the step of selecting by the processor the selected distance estimate comprises estimating velocity of movement of the mobile device to obtain a current velocity estimate, selecting the first current distance estimate in response to (1) magnitude of the current velocity estimate exceeding a predetermined speed threshold and (2) direction of the current velocity estimate pointing to a predetermined range of directions, and selecting the first previous distance estimate in response to (1) the magnitude not exceeding the predetermined speed threshold or (2) the direction not pointing to the predetermined range of directions.

In aspects, the step of selecting by the processor the selected distance estimate includes cumulating consecutive acceleration g-values above a predetermined g-threshold up to a predetermined cumulating number of consecutive acceleration g-values and ignoring further acceleration g-numbers after the predetermined cumulating number until a predetermined inactivity number of acceleration g-values not above the predetermined g-threshold, and using the cumulated acceleration g-values to weight a filter that selects between the first current distance estimate and the first previous distance estimate.

In aspects, the method also includes receiving by the asset-installed system the notification; the asset-installed system is a vehicle control system (VCS) installed in a vehicle; and the steps of automatically locking, automatically unlocking, automatically arming, and automatically disarming are performed by the asset-installed system.

In an embodiment, a method of automatic passive action operation includes obtaining received signal strength indications (RSSIs) of beacon transmissions of a vehicle control system (VCS) through a Bluetooth transceiver of a mobile device, by a processor of the mobile device, wherein the VCS is installed in a vehicle, and wherein the VCS comprises one or more Bluetooth-enabled beacons; obtaining movement-related indications of the mobile device by the processor; step for estimating distances between the mobile device and the vehicle based on the RSSIs and the movement-related indications, thereby obtaining distance estimates; step for determining whether one or more distance conditions are met by the distance estimates; sending from the mobile device to the VCS notifications in response to the distance conditions being met; and step for performing automatic actions by the VCS in response to the notifications.

In an embodiment, an apparatus includes a vehicle control system (VCS) comprising a beacon, the VCS being installed in a vehicle and configured to lock and unlock one or more access points of the vehicle, and to arm and disarm one or more security features of the vehicle; and a mobile device comprising a processing module, a memory coupled to the processing module and storing machine instructions of an app for execution by the processing module, a relatively-short range radio frequency (RF) transceiver connected to the processing module and controlled by the processing module, and one or more movement sensors readable by the processing module. The processing module is configured to execute the instructions to configure the mobile device to: obtain received signal strength indications (RSSIs) of transmissions of the beacon from the relatively-short range RF transceiver; obtain one or more movement-related indications from the one or more movement sensors; process the RSSIs to obtain a plurality of RSSI-derived values; estimate distances between the mobile device and the vehicle corresponding to the RSSI-derived values, thereby acquiring a time series of distance estimates, the time series of distance estimates comprising a previous distance estimate and a current distance estimate, the current distance estimate being later in the time series than the previous distance estimate; select a selected distance estimate from the current distance estimate and the previous distance estimate based on the one or more movement-related indications; determine whether one or more distance conditions are met by the selected distance estimate; and send automatically to the VCS notifications of the distance conditions being met, in response to any of the one or more distance conditions being met by the selected distance estimate, the notifications comprising arrival notifications in response to the mobile device approaching the vehicle to within a predetermined arrival distance, and departure notifications in response to the mobile device moving away from the vehicle to beyond a predetermined departure distance.

In aspects, the VCS is configured to: receive the notifications; automatically lock the one or more access points of the vehicle in response to receiving the departure notification; and automatically unlock the one or more access points of the vehicle in response to receiving the arrival notifications.

In aspects, the processing module and the instructions implement means for estimating distances between the mobile device and the vehicle based on the RSSIs and the movement-related indications, thereby obtaining the distance estimates; and means for determining whether one or more distance conditions are met by the distance estimates.

In an embodiment, a method of automatic passive action operation includes steps of obtaining one or more movement-related indications by a processor of a mobile device from one or more movement sensors of the mobile device; estimating stability of the movement-related indications by the processor, resulting in a position stability estimate; obtaining received signal strength indications (RSSIs) of a first beacon transmissions by a processor of a mobile device through a relatively-short range radio frequency (RF) transceiver of the mobile device; processing the RSSIs by the processor to obtain a plurality of RSSI-derived first values; estimating by the processor distances between the mobile device and the first beacon corresponding to the RSSI-derived first values, thereby acquiring a time series of first distance estimates, the time series of first distance estimates comprising a first previous distance estimate and a first current distance estimate, the first current distance estimate being later in the time series than the first previous distance estimate; selecting by the processor a selected distance estimate from the first current distance estimate and the first previous distance estimate based on the position stability estimate, wherein the first current distance estimate is selected if the position stability estimate meets a stability criterion, and selecting the first previous distance estimate if the position stability estimate does not meet the stability criterion; determining by the processor whether one or more distance conditions are met by the selected distance estimate; and in response to any of the one or more distance conditions being met by the selected distance estimate, notifying automatically an asset-installed system of the distance condition being met, the asset-installed system comprising the first beacon. The stability criterion may be met when the position stability estimate indicates movement of the mobile device with speed exceeding a predetermined value. The predetermined value may correspond to a running speed of a natural person. In embodiments, the predetermined value may be about 12 km/h or greater than 12 km/h.

Various features and aspects will be better understood with reference to the following description drawings, and appended claims.

DETAILED DESCRIPTION

Figure 1A:
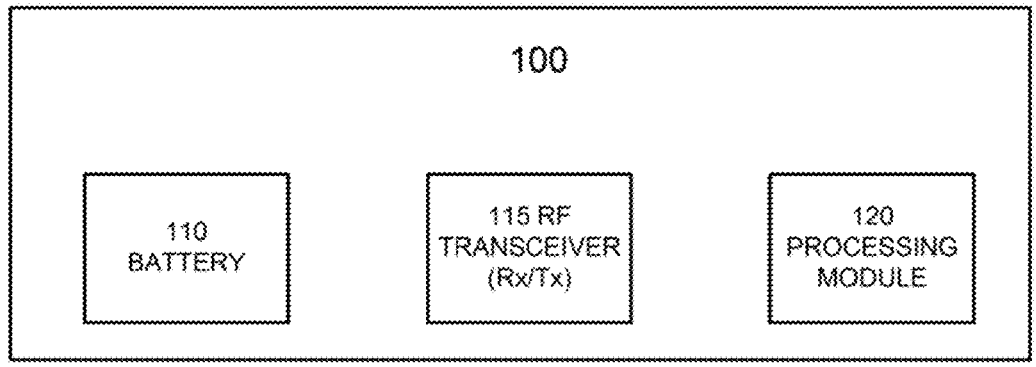
FIG. 1A illustrates selected components of a beacon of a vehicle control system in accordance with selected aspects described in this document.

The words "embodiment," "variant," "example," and similar words and expressions as used in this document refer to a particular apparatus, process, or article of manufacture, and not necessarily to the same apparatus, process, or article of manufacture. Thus, "one embodiment" (or a similar word/expression) used in one place or context may refer to a particular apparatus, process, or article of manufacture; the same or a similar expression in a different place or context may refer to a different apparatus, process, or article of manufacture. The expression "alternative embodiment" and similar words and phrases may be used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and are not necessarily strictly limiting.

The words "couple," "connect," and similar words/expressions/phrases with their inflectional morphemes, do not necessarily import an immediate or direct connection, but include within their meaning connections through mediate elements.

The expression "processing logic" should be understood as selected steps/decision blocks and/or hardware/software/firmware for implementing the selected steps/decision blocks. "Decision block" means a step in which a decision is made based on some condition, and subsequent process flow is selected based on whether the condition is met or not met.

An "access point" may be, e.g., door, sunroof, hatch (rear or otherwise), trunk of a vehicle/building/apartment/office, and other means for accessing place or thing.

"Passive keyless entry" or "PKE" refers to automotive control systems that can be configured to unlock a vehicle automatically in response to an authorized person approaching and being in proximity to the vehicle in which the system is installed. Some PKE-capable systems can be configured to unlock the vehicle in response to a door (or other entry point) handle of the vehicle being operated (pulled by the user). Some PKE-capable systems can be configured to unlock the vehicle in response to a door (or other entry point) handle touch sensor or button on the vehicle being triggered by the user. Some PKE-capable systems can be configured to lock the vehicle automatically in response to the user moving (walking) away from the vehicle. PKE-capable systems may be used with other vehicles, e.g., planes, boats, snow vehicles, and to secure structures or portions of structures, e.g., as part of home/business security systems and locks. "Automatic" in reference to an action, "Automatic passive action" capability, and "APA" capability refer to the capability of a system to take action automatically in response to a user with an authorized device approaching and/or departing a place or thing, such as a predetermined location, a vehicle, a building/structure or a predetermined portion of a building/structure. The action may be, e.g., locking/unlocking/opening/closing an access point or several access points of a vehicle/building/apartment/office; operating lights of a vehicle building/apartment/office; operating horn or another sound device of a vehicle/building/apartment/office; activating/deactivating alarm of a vehicle/building/apartment/office; starting and turning off engines/appliances, climate control systems, and/or entertainment devices. Thus, a PKE-capable system is an APA-capable system. These are examples, and below we will further address such actions in the context of describing arrival/departure events and actions. The authorized device may be a portable device, e.g., a key fob, a smartphone/tablet/computer, a smart watch, a wireless communications-capable bio- or biometric implant, or another device. APA-capable and PKE-capable systems are described, for example, in U.S. patent application entitled SMARTPHONE BASED PASSIVE KEYLESS ENTRY SYSTEM, Michael S. Simmons inventor, Ser. No. 14/459,036, filed on or about Aug. 13, 2014, U.S. Patent Application Publication Number 2015/0048927, which application and its related provisional application are incorporated herein by reference for all purposes, including their specifications, abstracts, figures, claims, and all other matter.

Some definitions have been explicitly provided above. Other and further explicit and implicit definitions and clarifications of definitions may be found throughout this document.

FIG. 1A illustrates selected components of a beacon (proximity sensor or part thereof) 100 installed in a vehicle and functioning in conjunction with (e.g., as part of) a vehicle control system (VCS) of the vehicle, and particularly in conjunction with an APA-capable system or passive keyless entry/action portion of the VCS. The VCS may be such as (or similar to or having selected components of) the vehicle control systems described in a now-allowed commonly-owned U.S. patent application entitled REMOTE VEHICLE SYSTEM CONFIGURATION, CONTROL, AND TELEMATICS, James S. Turner first-named inventor, Ser. No. 15/862,630, filed on or about Jan. 4, 2018, which is incorporated herein by reference for all purposes, including specification, abstract, figures, claims, and all other matter. (The U.S. patent application Ser. Nos. 15/862,630 and 14/459,036 may collectively be referred to as the "incorporated applications.") The VCS may also be of another type.

As shown in FIG. 1A, the beacon 100 incudes a battery 110 for powering the other components of the beacon 100. The battery 110 may be a primary battery. It can also be a rechargeable battery, such as a Lithium Ion (Li-Ion), Lithium-Polymer (LiPo), Nickle Cadmium (NiCad), Nickle Metal Hydride (NiMH), or lithium titanate battery. The use of the word "battery" here means one or more cells; the battery 110 may but need not have multiple cells. The battery 110 allows the beacon 100 to operate autonomously, without a wired power connection to the electrical system of the vehicle or to the VCS installed in the vehicle. In embodiments, however, the beacon 100 is wired to the electrical system or to the VCS of the vehicle and draws operating power from the vehicle's electrical system; the battery 110 is then not needed, though it may still be included in the beacon 100. In embodiments, the beacon 100 includes a wireless charging system for wirelessly recharging the battery, such as, for example, an inductive charging apparatus. In embodiments, the beacon 100 includes an electrical power generator that may supply the needed electrical energy for the operation of the beacon 100 alone and/or in conjunction with the battery 110. Examples of such electrical power generators include a mechanical generator that generates electrical power from the motion of the vehicle in which the beacon 100 is installed; photovoltaic cell(s); a converter of RF emissions or of low frequency (substantially non-radiating) EMF into electrical power suitable for operating the beacon 100; and other autonomous sources of electrical energy.

Although no connections are shown from the battery 110 to the other components of the beacon 100 that use electrical power, such connections are typically present. Moreover, the battery 110 may be able to provide electrical power for operation of devices that are external to the beacon 100 and are not part of the beacon 100. For example, the battery 110 may provide power for operation of a Global Positioning System (GPS) asset tracker and/or the VCS of the vehicle.

The beacon 100 also includes a transceiver 115. The transceiver 115 may be a relatively-short range transceiver, such as a Bluetooth® transceiver (including Bluetooth® Low Energy or "BLE" transceiver) which is capable of pairing with various other Bluetooth®-enabled devices and sending/receiving data to/from such Bluetooth®-enabled devices. The transceiver 115 may also or instead be a ZigBee® transceiver (IEEE 802.15.4), or another type of RF transceiver with similar range. This document, however, refers to Bluetooth® transceivers/receivers/transmitters, and the associated communications/links, for specificity of description, with the understanding that a person of average skill in the art, after careful perusal of this description and the attached drawings, can adapt the principles described to other communication standards or to non-standardized communications, with design changes as needed.

The Bluetooth® transceiver 115 may communicate and have active Bluetooth® links with two or more other Bluetooth®-enabled devices. Here the Bluetooth® transceiver 115 may simultaneously have active links to the user mobile device(s) (e.g., smartphones, tablets, smartwatches, key fobs of the VCS and/or of the vehicle), and to the VCS of the vehicle. Note that although FIG. 1A shows a single transceiver 115 and the discussion in this document refers to the transceiver 115 in the singular form, the transceiver 115 may include two or more receivers and/or transmitters; for example, two Bluetooth® transceivers may be included in the sensor 115, each capable of establishing one or more Bluetooth® links. The two or more transceivers may also employ different communication standards and/or non-standardized communication protocols. Moreover, the receiver portion may be omitted in some embodiments.

The beacon 100 additionally includes a processing block 120, which may have a processor or processors with supporting circuitry, such as memories including a non-volatile memory storing the machine instructions executed by the processor and configuration information. The configuration information may include the Bluetooth® pairing data for the vehicle control system and one or more user mobile devices. The processor or processors may be microprocessors, microcontrollers, dedicated or application-specific integrated circuit processors, other processors, or field-configurable processing logic.

The beacon 100 may also include an enclosure to contain the components of the sensor, and to facilitate installation of the beacon 100 in various locations or various vehicles.

Figure 1B:
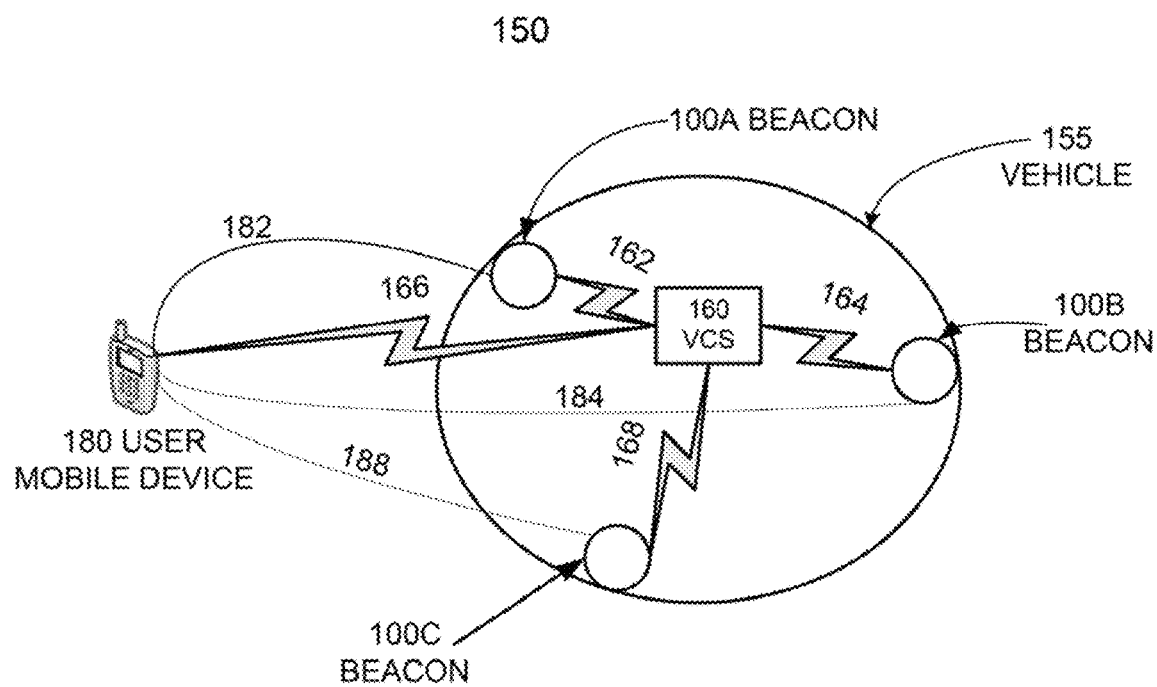
FIG. 1B illustrates selected parts of an arrangement including a vehicle control system with three beacons and a user mobile device, configured in accordance with selected aspects described in this document.

In examples, an installation includes one, two, three, or more beacons 100 that are attached to the vehicle in diverse locations, and configured to pair with the VCS of the vehicle and one or more user mobile devices. FIG. 1B illustrates selected parts of such an arrangement 150 in which a vehicle 155 includes a VCS 160 and three beacons 100A/100B/100C (each being such as the beacon 100 of FIG. 1A) paired with the VCS 160 via Bluetooth® links 162/164/168. The operation of the installed beacons 100 may be controlled by the VCS 160, and the beacons 100 may be configured to send over the links 162/164/168 data to be read by the VCS 160, and to read data transmitted to them by the VCS 160; the beacons 100 may also communicate with or sense presence of user mobile devices authorized to operate the VCS 160. FIG. 1B shows one such user mobile device 180, which is paired with the VCS 160 over a Bluetooth® link 166. Lines 182, 184, and 188 refer to (1) communication links between the beacons 100 and the user mobile device 180, and/or (2) sensing of RF transmissions of the user mobile device 180 by the beacons 100, and/or (3) sensing of RF transmissions of the beacons 100 by the user mobile device 180. The beacon-mobile communications and/or sensing designated by the lines 182/184/188 may be used, for example, to estimate the distances between the beacons 100 and the user mobile device 180. Thus, the beacons 100 need not exchange information with the user mobile device 180 and similar user mobile devices, although in embodiments the beacons 100 pair with authorized user mobile devices such as the user mobile device 180, and send information to, and/or receive information/commands, from the user mobile device(s). These pairing may be, for example, Bluetooth® pairings.

In embodiments, the processing block 120 configures each of the beacons 100 to broadcast periodically signals intended to notify compatible devices with RF transceivers of the beacon's presence within RF communication distance. The periodic broadcasts from a given beacon 100 may include unique identifiers of the beacon, for example, universally unique identifiers (UUIDs). The broadcasts may be Bluetooth® advertisement broadcasts that can be sensed by the user mobile device 180. As can be seen, there may be several beacons 100 installed in a vehicle or another location. The periodic broadcasts from the different beacons may be staggered in time to avoid collisions and allow the user mobile device 180 to sense multiple beacons 100 substantially at the same time. The VCS 160 may control the staggering and other facets of the beacons' operation. In embodiments, the user mobile device 180 may control the beacons 100 through the VCS 160.

The VCS 160 may include its own processing module that controls the operation of the VCS 160 and its interactions/communications with the beacons 100 and/or the authorized user mobile devices such as the user mobile device 180. The processing modules 120 of the beacons 100 may also be configured to communicate through their corresponding transceivers 115 with the VCS 160, and with the authorized user mobile device 180.

As has already been mentioned, the user mobile device 180 may be, for example, a key fob; a smartphone, such as an iPhone®- or an Android®-based phone; a tablet; a computer; a smartwatch; a wireless communications-capable biometric implant; or another device. The user mobile device 180 may include a relatively-short range RF transceiver capable of communicating with the VCS 160 and/or one or more of the beacons 100; this RF transceiver of the user mobile device 180 may include received signal strength indication (RSSI) circuitry configured to measure the strength of the RF signals received from the VCS 160 and the beacons 100, and indicate the measured strength (RSSI indications) to a processor of the user mobile device 180. The user mobile device 180 may also include one or more movement sensors configured to provide to the processor of the user mobile device 160 indication(s) of movement of the user mobile device 160; such sensors include, for example, accelerometers, gyrometers, other inertial sensors, and/or magnetometers. The user mobile device 180 may include additional RF transceiver(s), as would typically be the case with Bluetooth®-enabled smartphones which include cellular and WiFi transceivers. Moreover, the user mobile device 180 may include a light sensor readable by the processor; the light sensor readable by the processor may be used to sense the environment of the user mobile device 180, for example, to determine whether the user mobile device 180 is carried being inside a pocket, a purse, or a similar substantially enclosed space. The program code executed by the processor of the user mobile device 180 may include instructions that configure the user mobile device 180 to receive through the relatively-short range RF transceiver the signals emitted by the beacons 100 and/or the VCS 160, to receive the indications of movement provided by the one or more of the movement sensors of the user mobile device 180, and estimate distance to the beacons 100 based at least in part on the (1) indications of movement and (2) the RSSI indications of the signals from the RF transceiver(s) 115 of the beacons 100 and/or the VCS 160 of the vehicle. The program code may be an app (such as a mobile app) downloaded or otherwise provided to the user mobile device 180, and stored in a non-volatile memory module of the user mobile device 180.

Figure 2:
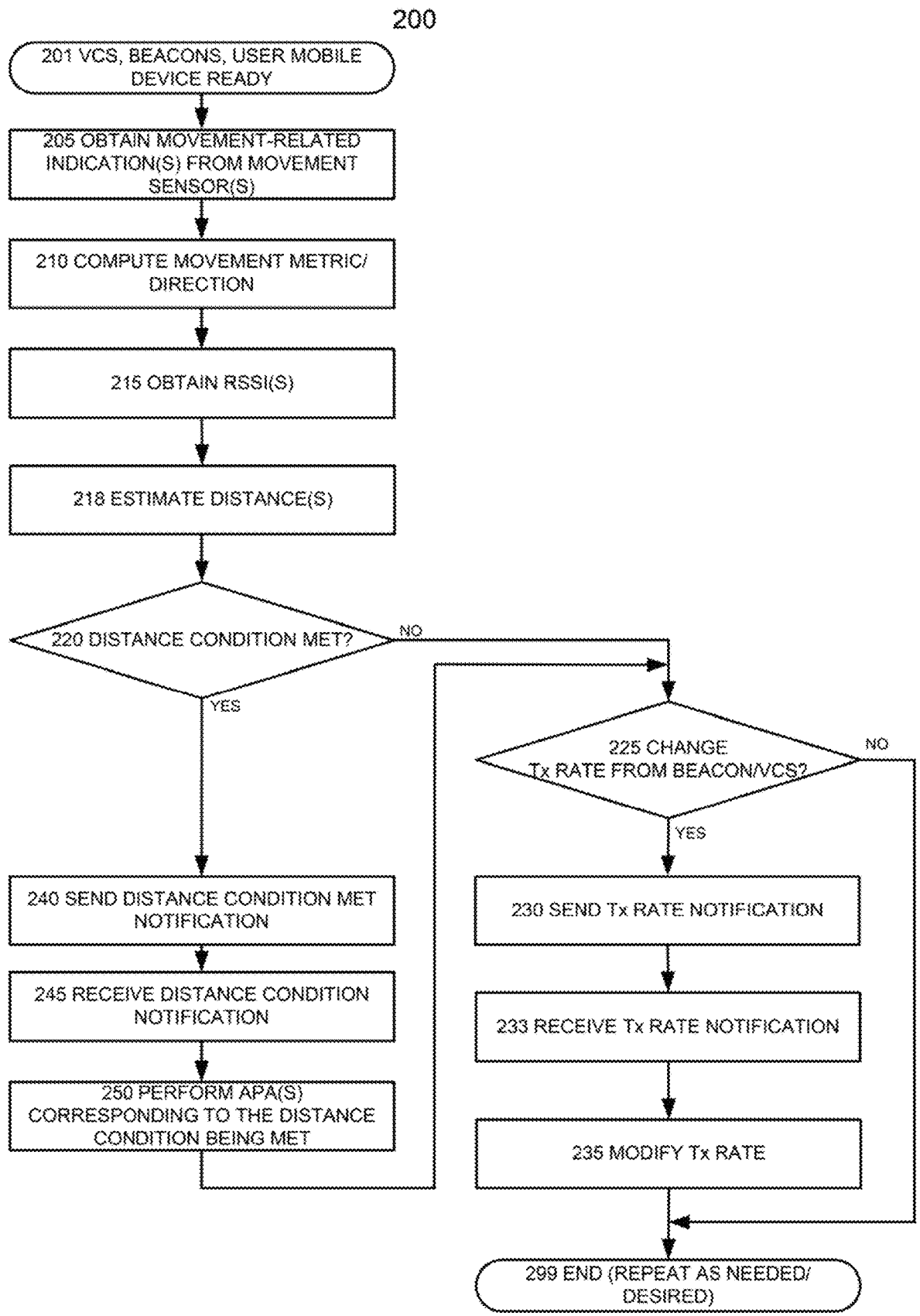
FIG. 2 illustrates selected steps of a process of automatic passive action, in accordance with selected aspects described in this document.

FIG. 2 illustrates selected steps of a process 200 of an exemplary passive keyless action implementation performed by a system including the combination of the VCS 160, the beacons 100, and the user mobile device 180, appropriately configured by the program code of the app of the user mobile device 180, of the VCS 160, and/or of the beacons 100. In the process 200, the beacons 100, the VCS 160, and the user mobile device 180 communicate using the Bluetooth® standard, and in some implementations, using Bluetooth® Low Energy (BLE) standard. Thus, the relatively-short range RF beacon transceiver(s) 115, the relatively-short range RF transceiver of the VCS 160, and a relatively-short range RF transceiver of the user mobile device 180 may be Bluetooth® or BLE transceivers, though other relatively-short range RF technologies and corresponding devices may be used. In implementations, the distances are estimated using RSSI values; see, for example, the description of iBeacon® protocol and BLE, and in particular the description of proximity sensing based on proximity profile (PXP) for operating Bluetooth® Low Energy beacons and other Bluetooth® devices. Note that in the present context, "relatively-short range RF" means RF communication range comparable to Bluetooth® or BLE range, in examples up to 1500 feet. Other techniques for communication between the beacons (e.g., 100) and/or the user mobile device(s) (e.g., 180) and for measuring/estimating the distances may be used. The use of RF signal strength for measuring/estimating distances, however, is specifically contemplated, so that a particular beacon 100 need not necessarily (but may) be paired to the authorized user mobile device (through Bluetooth®, for example) in order to estimate the distance between the user mobile device and the beacon 100 based at least in part on the RSSI indications. The measuring/estimating of the distances may additionally use the indications from the movement sensor(s) of the user mobile device 180.

At flow point 201, the VCS 160 and the beacon(s) 100 are installed in the vehicle, programmed/configured for operation, and powered-up; and the app for configuring the user mobile device 180 for automatic passive action(s) is downloaded to the user mobile device 180 and activated, configuring the user mobile device 180 for APA functionality, such as passive keyless entry (PKE) and passive locking of the vehicle. Configuring may include pairing the user mobile device 180 with the beacons 100 and with the VCS 160, including storing the UUIDs of the beacon(s) and/or the VCS 160 in the user mobile device 180, so that the UUIDs are registered with the operating system of the user mobile device 180 (including iOS and Android® OS). Additionally, at the flow point 201, the user mobile device 180 is not in the "sleep" or power-conserving mode, and the app is running in the foreground. For example, if the user mobile device 180 was in the sleep mode, when the user carrying the user mobile device 180 approaches the vehicle to a distance where the relatively-short range RF transceiver of the user mobile device 180 senses the transmissions from the one or more of the beacons 100 and/or the VCS 160, the user mobile device 180 "wakes up," exiting the sleep mode and running the app in the foreground.

From the flow point 201, the process proceeds to step 205, in which the processor of the user mobile device 180 obtains from the movement sensor of the user mobile device 180 (or from one or more of the movement sensors of the user mobile device 180) one or more readings indicating movement or absence of movement ("movement-related indication(s)") of the user mobile device 180. The processor of the user mobile device 180 may store the movement-related indication(s) in a memory of the user mobile device 180, for future use.

In step 210, the processor of the user mobile device 180 computes one or more movement metrics based on the movement-related indication(s) from the previous step, and stores the movement metric in the memory of the user mobile device 180. A movement metric may be an estimate of the speed/velocity of the user mobile device 180 based on the movement-related indications. The estimate may be based on the last movement-related indication(s) (the current one(s)), or each of a number of movement-related indications within a predetermined time period. In embodiments, the estimate is based on a moving average or a weighted moving average of a number of movement-related indications, for example, movement-related indications within a predetermined or learned movement computation period. The movement metric may be, for example a raw movement-related indication from the movement sensor(s); filtered or otherwise signal-conditioned movement-related indication(s); a weighted combination of movement-related indications, which indications may be filtered or otherwise signal conditioned; and/or another derivative of the current movement-related indication(s) and/or the previously-stored movement-related indication(s). In embodiments, the one or more movement metrics include an estimate of position displacement since a previous time, for example, since the last performance of the process 200, or from a predetermined time period preceding the current time of the performance of the process 200; the predetermined time period may be, for example, between one and four seconds.

The processor may also be configured to estimate the direction of movement of the user mobile device 180 from the movement-related indication(s) (current and previously-stored) and/or the RSSI(s) and/or GPS receiver data of the user mobile device 180 (from any one, any two, or all three of these data types). Note that a typical user mobile device, such as a smartphone, contains a GPS receiver accessible by the processor(s) of the user mobile device; in key fob embodiments, the key fob (which is the user mobile device in such embodiments) may be equipped with the GPS receiver, in addition to the relatively-short range RF transceiver and the movement sensor(s).

In step 215, the processor of the user mobile device 180 obtains from the relatively-short range RF® transceiver (e.g., a Bluetooth® transceiver) of the user mobile device 180 one or more received signal strength indications, RSSI(s). The processor of the user mobile device stores the RSSI(s), for example, in a memory of the user mobile device 180. In embodiments, on the first execution of the process 200, there is no need to obtain separately the RSSI(s), because recent RSSI(s) are available at the flow point 201. For example, if the user mobile device 180 obtains RSSI(s) when it wakes up within predetermined time period of the following step (decision block 220), the step 215 may be bypassed. In variants, this predetermined period may be less than 1 second, less than 2 seconds, less than 3 seconds, or less than another short period.

In step 218, the processor of the user mobile device 180 computes estimate(s) of distance(s) between the user mobile device 180 and the beacon(s) 100 and/or the VCS 160, based on the RSSI(s). For an RSSI between the user mobile device 180 and the beacon 100 or the VCS 160, the following formula may be used to estimate the distance d:

$$d = C^{\left(\frac{P-RSSI}{10*n}\right)}, \quad (1)$$

where C is a constant, typically about 10; P is the transmitted power in dBm, and n is a path-loss exponent constant, which may be about 2.2 in examples, and between 2.0 and 2.4 in other examples.

In embodiments, the processor is configured to discard the current RSSI-based distance estimate(s) (or skip obtaining them) if the movement-related indication(s) is/are unstable, and use the previous RSSI-based distance estimate(s). For example, if the position displacement estimate since the "previous time" (as described in relation to the step 210) is above a predetermined position tolerance, the current estimate may be discarded; the predetermined position tolerance may be set so that the corresponding speed (the predetermined position tolerance divided by the difference between the current time and the "previous time") is above about 12 km/h (relatively-fast running speed). In such embodiments, the remaining steps/decisions of the process 200 may be skipped and the process may terminate at flow point 299 (not shown in FIG. 2). Thus, when the displacement estimate is above the predetermined position tolerance as computed in the step 210, the steps beginning with the decision block 220, or even with the step 215 or 218, may be skipped and the process may terminate at the flow point 299. More generally, the processor may be configured to assume higher probability of current position being true based on stability of the received movement-related indications data.

In the decision block 220, the processor of the user mobile device 180 determines whether a distance condition has been met, based on the distance(s) derived from RSSI(s) and the movement metric in embodiments, the decision may additionally be based on the direction of movement data, such as the current and/or previous direction of movement estimate(s) of the step 210. In embodiments, the distance condition is met if the user mobile device 180 is beyond a predetermined distance ("departure distance") of the vehicle and there has been recent (e.g., since the previous computation of the movement metric or since the predetermined time period as discussed in relation to the step 210) movement in a general direction away from (not towards) the vehicle beyond a predetermined departure threshold speed; in embodiments, the distance condition is met if the user mobile device 180 is less than a predetermined distance ("arrival distance," which may be 2-3 meters, or comparable to inter-beacon distance of a typical passenger car installation) of the vehicle and there has been recent (e.g., since the previous computation of the movement metric) movement in a general direction towards the vehicle beyond a predetermined arrival threshold speed. The predetermined departure and arrival threshold speeds may be the same or they may differ from each other, but generally may be approximately equal to the speed of a slow walk, for example, 0.3-0.6 meters per second. Another way of determining whether the user of the mobile user device 180 is walking is to compare the movement sensor data over some period, say 2-5 seconds, to one or more pre-stored patterns corresponding to pedometric data; if the difference between the movement sensor data and one of the pre-stared patterns is within some pattern limit, the processor of the mobile user device 180 may assume that the user is walking and base the then decision on the RSSI(s), and vice versa. (The pedometric data may be normalized to the amplitude of the pre-stored pattern, the time scale of the pedometric data may be changed slightly to correspond to the pattern, and the difference may then be computed using root-mean-square technique.) Yet another way, a scalar technique used. A 20 Hz (or more broadly 5-40 Hz) accelerometer vector magnitude is thresholded for a predetermined value, for example, 0.05-0.15 g. Consecutive values above the threshold are cumulated, resulting in an estimate of current velocity, and the velocity is cumulated over time (essentially, integrated), resulting in an estimate of a distance displacement; further acceleration values may be ignored until at least 10 samples of inactivity (accelerometer reading below the predetermined value of the threshold). The predetermined value of the threshold may be set to roughly correspond to velocity during a person's walking or running. The cumulated distance displacement and/or velocity data may be used to control the weight (confidence) of a filter which adapts between past RF-based distance and current estimates. Lack of motion for a predetermined time period may cause the filter to discard the current RF distance estimates.

As described above in relation to the steps/decision 215/218/220, the estimate of the distance between the user mobile device 180 and the vehicle is based on the RSSI(s) and the computed distance estimates were compared to distance thresholds. An alternative and generally equivalent way is to convert the distance threshold (e.g., the arrival and departure distances) to received power thresholds, and compare the RSSI(s) to the power threshold(s) that can be computed from the formula (1). For example, the departure condition may be met if an RSSI (which may be filtered) or a combination of RSSIs such as a moving average (which may be filtered) is less than (or less than or equal to) a predetermined and/or learned departure power limit and there has been recent movement beyond the departure threshold speed away from the vehicle. As another example, the arrival condition may be met if an RSSI (which may be filtered) or a combination of RSSIs such as a moving average (which may be filtered) is greater than (or greater than or equal to) a predetermined and/or learned arrival power limit and there has been recent movement beyond the arrival threshold speed towards the vehicle.

In embodiments, the processor of the user mobile device 180 reads the output of the light sensor, and the distance thresholds (e.g., arrival distance, departure distance, corresponding power thresholds) are raised by a predetermined amount (e.g., 4-6 dB) when the light sensor senses light above a predetermined light threshold (the light threshold is applied to the output of the light sensor), because the user mobile device 180 is likely not in a user's pocket, handbag, or another type of container or carrying pouch.

If the distance condition has not been met the process how continues to decision block 225, in which the processor of the user mobile device 180 decides whether to notify the VCS 160 and/or the beacon(s) 100 to change the period between its RF transmissions to the user mobile device 180. For example, as the user mobile device 180 approaches the vehicle, at some point (relatively near or at the arrival distance) the user mobile device 180 may send to the VCS 160 and/or the beacon(s) 100 a Tx rate notification to increase the rate of the transmissions (decrease the period between the transmissions). In another example, as the user mobile device 180 moves away from the vehicle, at some point (beyond or at the departure distance) the user mobile device 180 may send to the VCS 160 and or the beacon(s) 100 a Tx rate notification to decrease the rate of the transmissions (increase the period between the transmissions). The Tx rate notifications to increase and decrease the Tx rate may be sent using, e.g., a Bluetooth® push object. (Other notifications mentioned in this document may be similarly sent using Bluetooth® push objects.)

If the decision in the decision block 225 is affirmative, the processor of the user mobile device 180 sends an appropriate Tx rate notification (e.g., increase rate, decrease rate) to the VCS 160 and/or the beacon(s) 100, in step 230. The user mobile device 180 may send the Tx rate notification from its relatively-short range RF transceiver to the RF transceiver of the VCS 160; the user mobile device 180 may instead or additionally send this notification through another channel, for example, directly or indirectly through a cellular connection to a remote server configured to communicate with the VCS 160 (which in this case has a connection to the remote server, for example, a cellular connection). The user mobile device 180 may also or instead send the notification directly to the beacon 100.

In step 233, the VCS 160 and/or the beacon(s) 100 receive the Tx rate notification. In step 235, the VCS 160 and/or the beacon(s) 100 change the rate in accordance with the Tx rate notification. The VCS 160 and/or the beacon(s) 100 may control the rate of their transmissions based on the Tx rate notifications and/or other information including battery state(s) of the VCS 160 and/or of the beacon(s) 100. Thus, in some examples, the VCS 160 and/or the beacon(s) 100 may ignore Tx rate notifications. In examples, the period between the transmissions from the beacon(s) 100 is reduced from greater than 200 ms to less than 40 ms, in response to the user mobile device 180 approaching the vehicle and crossing to within the arrival distance or some other predetermined distance of the VCS 160 and/or of the beacon(s) 100; and similarly, in examples, the period is increased from less than 40 ms to greater than 200 ms in response to the user mobile device 180 moving away from the vehicle and crossing to beyond the departure distance or another predetermined distance.

The process flow may then terminate at the flow point 299. The process 200 may be repeated as needed and/or desired.

Let us now return the decision block 220 (whether a distance condition has been met). If the processor of the user mobile device 180 decides that the distance condition has been met, the process flow then may continue to step 240, in which the user mobile device 180 sends an APA notification to the VCS 160 that the distance condition has been met. The user mobile device 180 may send the APA notification from its own relatively-short range RF transceiver to the relatively-short range RF transceiver of the VCS 160; the user mobile device 180 may instead or additionally send this notification through another channel, for example, directly or indirectly through a cellular connection to a remote server configured to communicate with the VCS 160 (which in this case has a connection to the remote server, for example, a cellular connection). The notification may be, for example, an arrival event notification in response to the user mobile device 180 approaching the vehicle. As another example, the notification may be a departure event notification in response to the user mobile device 180 moving away from the vehicle. The user mobile device 180 may send the notification to the VCS 160 in response to the distance condition being met relative to one or more of the beacon(s) 100. The notification may include an identification of the particular beacon(s) 100, so that the VCS 160 infers from which direction the user mobile device 180 is approaching.

The VCS 160 receives the APA notification, in step 245, and, in step 250, performs automatic passive action(s) in response to the APA notification. (There may or may not be additional conditions for performing the action(s).) Automatic passive actions may include arrival event actions that may be performed in response to the user mobile device 180 approaching the vehicle to within the arrival distance, and departure event actions that may be performed in response to the user mobile device 180 moving away from the vehicle beyond the departure distance. Arrival event actions may be, e.g., unlocking/opening an access point or several access points of a vehicle, particularly the access point(s) corresponding to the direction from which the user mobile device 180 is approaching, such as the access point nearest the beacon that is nearest to the approaching user mobile device 180; operating light(s)/horn; deactivating alarm; starting engine; and activating climate control systems. The departure event actions may be, e.g., locking/closing an access point or several access points of a vehicle; operating lights/horn; activating alarm; turning off engine; and turning off accessories and/or other vehicle systems. These are non-exclusive APA examples.

Some distance (power) hysteresis and/or time delays may be built into the system/process, so that the arrival event actions and departure event actions are not performed one after another (e.g., doors do not keep locking and unlocking as the user walks near the vehicle). In embodiments, when the user mobile device 180 is within the arrival distance of a particular beacon for a prolonged time (e.g., >1 minute, >2 minutes, >3 minutes), the user mobile device 180 sends commands to the VCS 160 to reduce the transmit power of the beacon(s) in predetermined steps, for example, in steps of between 3 and 5 dB. The broadcast power may be reset to the highest transmission power time after the user mobile device 180 moves away from the vehicle (beacon(s) 100) to beyond a predetermined distance (as measured by the RSSI(s)), which may be equal to the arrival distance, the departure distance, or another predetermined distance. This helps ensure that there is no time when the beacon continuously wakes up the app in the user mobile device 180.

The process flow may then continue to the decision block 225 and following steps, as is described above.

As a person skilled in the art would recognize after careful perusal of this entire document (including the appended claims, drawings, and the incorporated subject matter), the same method or apparatus may be practiced using either the arrival distance and the departure distance decisions/comparisons, or both arrival distance and the departure distance. For example, the system (the VCS 160, the beacon(s) 100, and the user mobile device 180) may be configured to lock the vehicle, raise the vehicle's window(s), and/or activate the vehicle's alarm in response to the user mobile device 180 moving away from the vehicle (as indicated by the RSSI(s) and the movement-related indication(s)) to beyond the departure distance (the measurement computation falling to below the departure power limit, because the RSSI is expected generally to fall as the user mobile device 180 moves away from the vehicle). Similarly, the same or another analogous system may be configured to unlock the vehicle's door(s)/trunk/hatch/liftgate, lower the window(s), and/or deactivate the vehicle's alarm in response to the user mobile device 180 approaching the vehicle (as indicated by the RSSI(s)) to within the arrival distance (the measurement computation increasing to/above the arrival power limit, because the RSSI is expected generally to increase as the user mobile device 180 approaches the vehicle).

Figure 3:
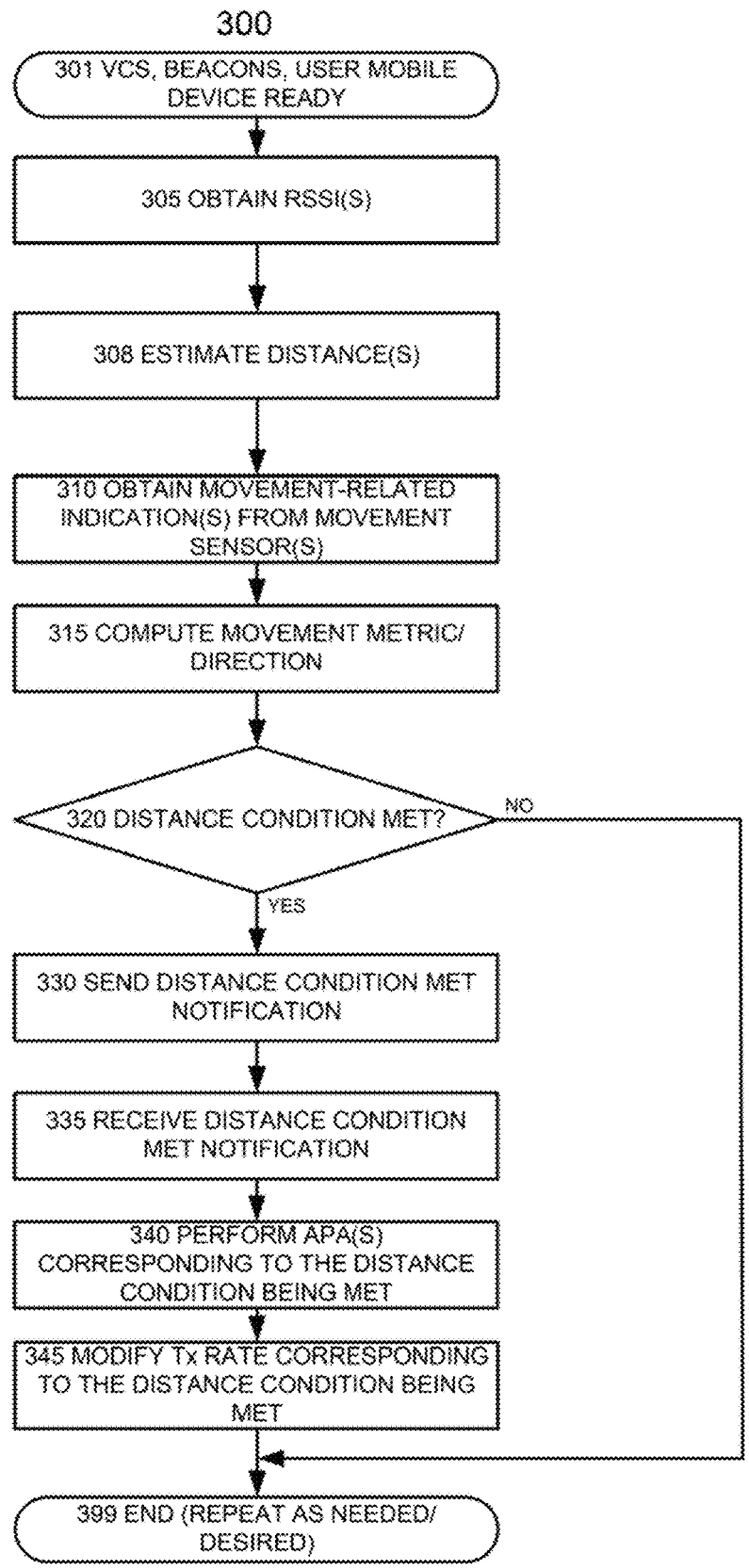
FIG. 3 illustrates selected steps of another process of automatic passive action, in accordance with selected aspects described in this document.

In the process 200, the user mobile device 180 obtains the movement-related indication(s) before obtaining the RSSI(s), and decides whether the distance condition has been met before deciding whether the Tx rate should be changed. Here and throughout this description/drawings, however, the process steps and decisions (if decision blocks are present) may be performed by same and/or separate elements, in conjunction or in parallel, asynchronously or synchronously, in a pipelined manner, or otherwise. There is no particular requirement that the steps and decisions be performed in the same order in which this description lists them and/or the Figures show them, except where a specific order is inherently required, explicitly indicated, or is otherwise made clear from the context. For example, the user mobile device 180 may obtain the movement-related indication(s) after or concurrently with obtaining the RSSI(s). Similarly, the decision regarding changing the Tx rate may precede the decision regarding meeting the distance condition. Moreover, the decision regarding meeting, the distance condition may also be used to control the Tx rate; in this example, the Tx rate may be changed in response to the distance condition being met. FIG. 3 illustrates selected steps of a process 300 of an exemplary operation of the system (VCS/beacons/mobile) with such changes.

At flow point 301, the VCS and the beacon(s) 100 are installed in the vehicle, programmed/configured for operation, and powered-up; and the app for configuring the user mobile device 180 for APA is downloaded to the user mobile device 180 and activated, configuring the user mobile device 180 for APA functionality, such as passive keyless entry (PKE) and passive locking of the vehicle. This flow point is similar to the flow point 201 of the process 200, described above. Other steps and decision block of the process 300 may also be similar to the similarly-named steps block of the process 200, described above.

In step 305, the processor of the user mobile device 180 obtains from the relatively-short range RF transceiver of the user mobile device 180 one or more received signal strength indications, RSSI(s). The processor of the user mobile device stores the RSSI(s), for example, in a memory of the user mobile device 180. In embodiments, on the first execution of the process 300, there is no need to obtain separately the RSSI(s), because recent RSSI(s) are available at the flow point 301.

In step 308, the processor of the user mobile device 180 computes estimate(s) of distance(s) between the user mobile device 180 and the beacon(s) 100 and/or the VCS 160, based on the RSSI(s). This step may be similar to the step 218 described above, and may use the same formula (1).

In step 310, the processor of the user mobile device 180 obtains from the movement sensor of the user mobile device 180 (or from one or more of the movement sensors of the user mobile device 180) one or more movement-related indication(s) of the user mobile device 180. The processor of the user mobile device 180 may store the movement-related indication(s) m a memory of the user mobile device 180, for future use.

In step 315, the processor of the user mobile device 180 computes a movement metric based on the movement-related indication(s) from the previous step, and stores the movement metric in the memory of the user mobile device 180. The processor may also estimate the direction of movement of the user mobile device 180 from the movement-related indication(s) (current and previously-stored) and/or the RSSI(s) and/or a GPS receiver of the user mobile device 180.

As was the case in the process 200, in embodiments, the processor is configured to discard the current RSSI-based distance estimate(s) if the movement-related indication(s) is/are unstable, and use the previous RSSI-based distance estimate(s). For example, if the position displacement estimate since the "previous time" (as described in relation to the step 210) is above a predetermined position tolerance, the current estimate may be discarded; the predetermined position tolerance may be set so that the corresponding speed (the predetermined position tolerance divided by the difference between the current time and the "previous time") is above about 12 km/h (relatively-fast running speed). In such embodiments, the remaining steps/decisions of the process 200 may be skipped and the process may terminate at flow point 399 (not shown in FIG. 3).

In decision block 320, the processor of the user mobile device 180 determines whether a distance condition has been met, based on the RSSI(s) and the movement metric; in embodiments, the decision may additionally be based on the direction of movement data. The decision block 320 may be identical, analogous, or similar to the decision block 220 described above in relation to the process 200.

If the distance condition has not been met, the process flow may terminate, at flow point 399. The process 300 may then be repeated as needed and/or desired.

If the distance condition has been met, the process flow may continue to step 330, in which the user mobile device 180 sends an APA notification to the VCS 160 that the distance condition has been met.

The VCS 160 receives the APA notification, in step 335.

In step 340, the PCS 160 performs the automatic passive action(s) in response to the APA notification; the automatic passive action(s) may depend on the APA notification, for example, on whether the APA notification notifies of the approach or departure of the user mobile device 180. There may or may not be additional conditions for performing the APA(s). Some distance (power) hysteresis and/or time delays may be built into the system/process, so that the arrival event actions and departure event actions are not performed one after another.

In step 345, the PCS 160 and/or the beacon(s) 100 change the rate in accordance with the type of the distance condition that was met (in decision block 320). In examples, the period between the transmissions from the beacon(s) 100 and/or the PCS 160 is reduced from greater than 201 ms to less than 40 ms, in response to the user mobile device 180 approaching the vehicle and crossing to within the arrival distance of the VCS 160 and/or the beacon(s) 100; and similarly, the period is increased from less than 40 ms to greater than 200 ms in response to the user mobile device 180 moving away from the vehicle and crossing to beyond the departure distance.

Figure 4:
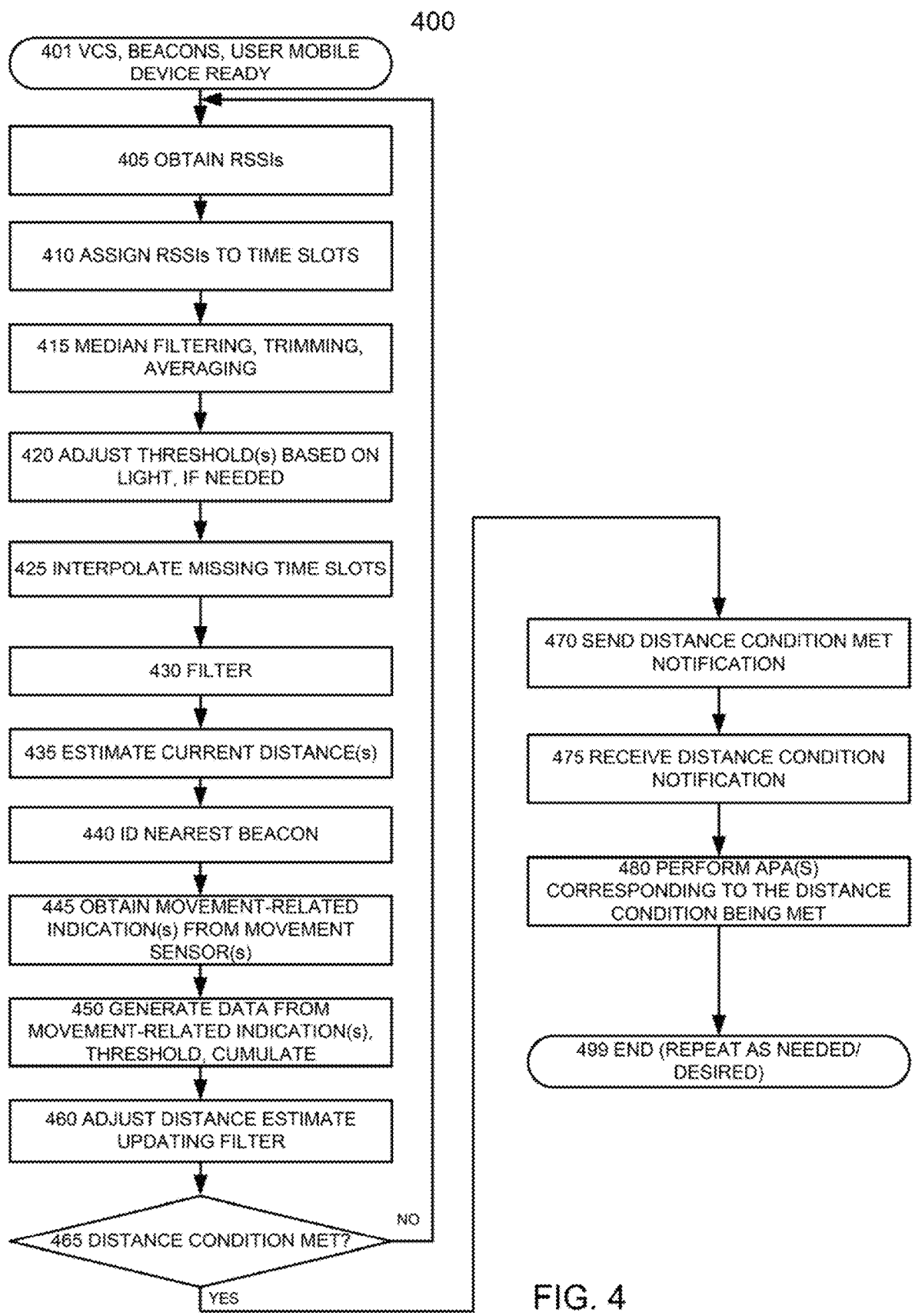
FIG. 4 illustrates selected steps of yet another process of automatic passive action, in accordance with selected aspects described in this document.

FIG. 4 illustrates selected steps of a process 400 of another exemplary operation of the PCS/beacons/mobile system.

At flow point 401, the VCS and the beacons 100 are installed in the vehicle, programmed/configured for operation, and powered-up; and the app for configuring the user mobile device 180 for automatic passive action is downloaded to the user mobile device 180 and activated, configuring the user mobile device 180 for APA functionality, such as passive keyless entry (PKE) and passive locking of the vehicle. The app is running in the foreground.

In step 405, the processor of the user mobile device 180 receives/collects beacon transmissions, and saves RSSI(s) of the transmissions together with their time stamps and beacon UUIDs. The beacon transmissions may be sent, for example, every 25-50 millisecond.

In step 410, the processor assigns the collected RSSI(s) of each beacon into longer time slots, for example 180-300 millisecond time slots.

In step 415, the processor implements median filtering and trimming the lower and upper quantiles of the RSSIs; the remaining samples of each time slot may be averaged.

In step 420, the processor determines whether it is inside a pocket/handbag/pouch/container, and selects or adjusts the power/distance thresholds accordingly. The power thresholds may be lowered by 4-6 dB when the light sensor indicates that the user mobile device is enclosed; distance thresholds may be adjusted analogously, for example, using distance differences based on the formula (1).

In step 425, the processor interpolates missing time slots in discrete series; linear projection from last 2-4 samples or time slots may be used for this purpose.

In step 430, the processor applies filtering to the discrete interpolated RSSI(s). Kalman filter with confidence based on recent data stability (proportional to inverse standard deviation of finite past, e.g., 4-8 samples) may be employed. This is similar to weighted filtering here between past and current samples, weighted proportionally to inverse standard deviation of finite past 4-8 samples. An asymmetrical proportionality constant of about 0.6 may be selected for increasing RSSI, and of about 0.3 for decreasing RSSI. The filter may perform a step change (resets) when it experiences a constant input for an extended time (e.g., 10 samples for increasing, 16 for decreasing), rather than slowly adapting.

In step 435, distance conversion is performed. Formula (1) may be used, or its equivalent/counterpart for power thresholding.

In step 440, the nearest (minimum distance) beacon is identified, based on the beacon distances computed in the previous step. This suggests or indicates the zone or access point to be disarmed/unlocked/opened. For example, trunk or driver side door may be unlocked, or a side door of a minivan may be unlocked and opened.

In step 445, the processor receives movement-related indication(s) from the inertial/movement sensor(s) of the user mobile device 180, and stores the movement-related indications in a memory of the user mobile device 180.

In step 450, the processor generates or updates pedometer-style data from the movement-related indications, and thresholds a low frequency (10-40 Hz) accelerometer vector magnitude for a predetermined threshold, e.g., 0.05 g-0.15 g. Consecutive values of the magnitude above the predetermined threshold are cumulated in the memory; further values above the threshold may be ignored, until the processor detects at least a predetermined number N (e.g., 5-20) samples of inactivity (below the threshold). The cumulated value roughly corresponds to displacement of the user mobile device 180, for example, displacement during the user walking/running with the user mobile device 180.

In step 460, the processor uses the cumulated value of the movement-related indications from the previous step to control the weight (confidence) of a filter which adapts between past RSSI-computed distance and the current distance estimate from the step 435. Lack of motion may cause the filter to discard the current distance estimate. This tames the RSSI-based estimated distance fluctuations above and below the lock/unlock thresholds. Thus, for example, the pedometer-style update of motion updates only when the user walks, and not during the user's hand gestures while holding the user mobile device 180.

In decision block 465, the processor of the user mobile device 180 determines whether a distance condition has been met and one or more APAs should be performed. Here the processor may use the output of the filter in the step 460 to select between the filtered past RSSI-computed distance and the current distance estimate, thereby obtaining a selected distance estimate, and compares the selected distance estimate to one or more of the predetermined distance conditions (e.g., arrival distance, departure distance). In the case of arrival distance (the user mobile device 180 is moving towards the vehicle/beacon), the distance condition is met if the selected distance estimate is less than (or less than or equal to) the arrival distance; in the case of departure distance (the user mobile device 180 is moving away from the vehicle/beacon), the distance condition is met if the selected distance estimate is greater than (or greater than or equal to) the departure distance.

If the currently-applied distance condition is not met, the process flow may terminate to be repeated as needed or desired, or, as shown, return to the step 405. If the currently-applied distance condition is met, process flow proceeds to step 470, in which the processor causes the user mobile device 180 to send an APA notification to the VCS 160 that the distance condition has been met, suggesting, for example, lock/unlock, or (an)other APA action(s) corresponding to the distance condition that has been met. (This and the following is steps are similar to the steps 240/245/250 and 330/335/340 of the processes 2 and 3, described above.)

The VCS 160 receives the APA notification, in step 475, and, in step 480, performs the automatic passive action(s) in response to the APA notification and corresponding to the distance condition that was met. (There may or may not be additional conditions for performing the action(s).)

The process flow may then terminate in flow point 499, as shown in FIG. 4, or return to the step 405.

Not every illustrated/described step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The features (elements/limitations) described throughout this document may be present individually, or in any combination or permutation, except where the presence or absence of specific features is inherently required, explicitly indicated, or is otherwise made clear from the description. This applies whether or not the features appear related to specific embodiments; in other words, features of one described or illustrated embodiment may be included in another described or illustrated embodiment.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Program able ROM (EPROM), Electrically Erasable Programmable ROM (EEPROM), hard disk, a CD-ROM, a DVD-ROM, or other form of non-transitory storage medium. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for passive keyless actions using RF power measurements together with movement-related indications. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A method of automatic passive action operation, the method comprising steps of:
    obtaining received signal strength indications (RSSIs) of a first beacon transmissions by a processor of a mobile device through a relatively-short range radio frequency (RF) transceiver of the mobile device;
    obtaining one or more movement-related indications by the processor from one or more movement sensors of the mobile device;
    processing of the RSSIs by the processor to obtain a plurality of RSSI-derived first values;
    estimating by the processor distances between the mobile device and the first beacon corresponding to the RSSI-derived first values thereby acquiring a time series of first distance estimates, the time series of first distance estimates comprising a first previous distance estimate and a first current distance estimate, the first current distance estimate being later in the time series than the first previous distance estimate;
    selecting by the processor a selected distance estimate from the first current distance estimate and the first previous distance estimate based on the one or more movement-related indications;
    determining by the processor whether one or more distance conditions are met by the selected distance estimate; and
    in response to any of the one or more distance conditions being met by the selected distance estimate, notifying automatically an asset-installed system of the distance condition being met, the asset-installed system comprising the first beacon.

2. The method of claim 1, wherein the one or more distance conditions comprise an arrival distance condition and a departure distance condition, wherein the arrival distance condition is met in response to the mobile device moving to within a predetermined arrival distance of the first beacon, and the departure distance condition is met in response to the mobile device moving away from the first beacon to beyond a predetermined departure distance.

3. The method of claim 2, wherein the asset-installed system is installed in a vehicle.

4. The method of claim 3, wherein the asset-installed system is configured to control access to the vehicle including locking and unlocking of one or more access points of the vehicle and arming and disarming of one or more security features of the vehicle.

5. The method of claim 4, wherein:
    the step of notifying comprises sending an arrival notification in response to the arrival distance condition being met;
    the step of notifying comprises sending a departure notification in response to the departure distance condition being met;
    automatically locking the one or more access points of the vehicle by the asset-installed system in response to receiving the departure notification bye the asset-installed system; and
    automatically unlocking the one or more access points of the vehicle by the asset-installed system in response to receiving, the arrival notification by the asset-installed system.

6. The method of claim 5, further comprising:
    automatically arming the one or more security features in response to receiving the departure notification by the asset-installed system; and
    automatically disarming the one or more security features in response to receiving the arrival notification by the asset-installed system.

7. The method of claim 6, wherein the relatively-short range RF transceiver of the mobile device comprises a transceiver selected from the group consisting of a Bluetooth transceiver and a Bluetooth Low Energy transceiver.

8. The method of claim 6, wherein the mobile device is a keyfob.

9. The method of claim 6, Wherein the mobile device is a smartphone.

10. The method of claim 6, wherein the mobile device is a smartwatch.

11. The method of claim 6, wherein the mobile device comprises a bioimplant.

12. The method of claim 6, wherein the step of processing of the RSSIs by the processor to obtain the plurality of RSSI-derived first values comprises:
    assigning the RSSIs into a plurality of time slots;
    trimming lower and upper RSSIs in each time slot;
    averaging remaining RSSIs of said each time slot to obtain RSSI average for said each time slot;
    if time slots with missing RSSI averages are present, interpolating RSSI averages for the time slots with missing RSSI averages; and filtering the RSSI averages with a Kalman filter to derive the plurality of RSSI-derived first values.

13. The method of claim 12, wherein the step of estimating comprises step for estimating by the processor distances between the mobile device and the first beacon corresponding to the RSSI-derived first values.

14. The method of claim 13, wherein the step of selecting by the processor the selected distance estimate comprises step for selecting the selected distance estimate.

15. The method of claim 13, wherein the step of selecting by the processor the selected distance estimate comprises estimating speed of movement of the mobile device to obtain a current speed estimate, selecting the first current distance estimate in response to the current speed estimate exceeding a predetermined speed threshold, and selecting the first previous distance estimate in response to the current speed estimate not exceeding the predetermined speed threshold.

16. The method of claim 13, wherein the step of selecting by the processor the selected distance estimate comprises estimating velocity of movement of the mobile device to obtain a current velocity estimate, selecting the first current distance estimate in response to (1) magnitude of the current velocity estimate exceeding a predetermined speed threshold and (2) direction of the current velocity estimate pointing to a predetermined range of directions, and selecting the first previous distance estimate in response to (1) the magnitude not exceeding the predetermined speed threshold or (2) the direction not pointing to the predetermined range of directions.

17. The method of claim 13, wherein the step of selecting by the processor the selected distance estimate comprises cumulating, consecutive acceleration g-values above a predetermined g-threshold up to a predetermined cumulating number of consecutive acceleration g-values and ignoring further acceleration g-values after the predetermined cumulating number until a predetermined inactivity number of acceleration g-values not above the predetermined g-threshold, and using the cumulated acceleration g-values to weight a filter that selects between the first current distance estimate and the first previous distance estimate.

18. The method of claim 13, further comprising:
receiving by the asset-installed system the notification;
wherein:
the asset-installed system comprises a vehicle control system (VCS) installed in a vehicle; and
the steps of automatically locking, automatically unlocking, automatically arming, and automatically disarming are performed b the asset-installed system.

19. A method of automatic passive action operation, the method comprising:
obtaining received signal strength indications (RSSIs) of beacon transmissions of a vehicle control system (VCS) through a Bluetooth transceiver of a mobile device, by a processor of the mobile device, wherein the VCS is installed in a vehicle, and wherein the VCS comprises one or more Bluetooth-enabled beacons;
obtaining movement-related indications of the mobile device by the processor;
step for estimating distances between the mobile device and the vehicle based on the RSSIs and the movement-related indications, thereby obtaining distance estimates;
step for determining whether one or more distance conditions are met by the distance estimates;
sending from the mobile device to the VCS notifications in response to the distance conditions being met; and
performing one or more automatic actions by the VCS in response to the notifications, the one or more automatic actions being selected from the group consisting of locking one or more access points of the vehicle, unlocking one or more access points of the vehicle, activating an alarm system of the vehicle, deactivating the alarm system of the vehicle, opening one or more access points of the vehicle, closing one or more of the access points of the vehicle, operating one or more lights of the vehicle, operating a horn of the vehicle, starting an engine of the vehicle, turning off the engine of the vehicle, and operating a climate control system of the vehicle.

20. An apparatus comprising:
a vehicle control system (VCS) comprising a beacon, the VCS being installed in a vehicle and configured to lock and unlock one or more access points of the vehicle, and to arm and disarm one or more security features of the vehicle; and
a mobile device comprising, a processing module, a memory coupled to the processing module and storing machine instructions of an app for execution by the processing module, a relatively-short range radio frequency (RF) transceiver connected to the processing module and controlled by the processing module, and one or more movement sensors readable by the processing module;
wherein the processing module is configured to execute the instructions to configure the mobile device to:
obtain received signal strength indications (RSSIs) of transmissions of the beacon from the relatively-short range RF transceiver;
obtain one or more movement-related indications from the one or more movement sensors;
process the RSSIs to obtain a plurality of RSSI-derived values;
estimate distances between the mobile device and the vehicle corresponding to the RSSI-derived values, thereby acquiring a time series of distance estimates, the time series of distance estimates comprising a previous distance estimate and a current distance estimate, the current distance estimate being later in the time series than the previous distance estimate;
select a selected distance estimate from the current distance estimate and the previous distance estimate based on the one or more movement-related indications;
determine whether one or more distance conditions are met by the selected distance estimate; and
send automatically to the VCS notifications of the distance conditions being met, in response to any of the one or more distance conditions being met by the selected distance estimate, the notifications comprising arrival notifications in response to the mobile device approaching the vehicle to within a predetermined arrival distance, and departure notifications in response to the mobile device moving away from the vehicle to beyond a predetermined departure distance.

21. The apparatus of claim 20, wherein the VCS is configured to:
receive the notifications;
automatically lock the one or more access points of the vehicle in response to receiving the departure notification;
automatically unlock the one or more access points of the vehicle in response to receiving the arrival notifications.

22. The apparatus of claim 21, wherein the processing module and the instructions comprise:
- means for estimating distances between the mobile device and the vehicle based on the RSSIs and the movement-related indications, thereby obtaining the distance estimates; and
- means for determining whether one or more distance conditions are met by the distance estimates.

* * * * *

UNITED STATES PATENT AND TRADEMARK OFFICE
CERTIFICATE OF CORRECTION

PATENT NO. : 11,055,936 B2  
APPLICATION NO. : 16/401704  
DATED : July 6, 2021  
INVENTOR(S) : Aravind Warrier et al.

Page 1 of 1

It is certified that error appears in the above-identified patent and that said Letters Patent is hereby corrected as shown below:

In the Claims

Column 19, Line 58, cancel "values thereby" and replace with --values, thereby--;

Column 20, Line 33, cancel "bye" and replace with --by--;

Column 20, Line 37, cancel "receiving, the" and replace with --receiving the--;

Column 20, Line 52, cancel "Wherein" and replace with --wherein--;

Column 21, Line 33, cancel "cumulating, consecutive" and replace with --cumulating consecutive--;

Column 21, Line 49, cancel "performed b the" and replace with --performed by the--;

Column 22, Line 20, cancel "comprising, a processing" and replace with --comprising a processing--;

Column 22, Line 63, cancel "tion;" and replace with --tion; and--.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*